No. 843,002. PATENTED FEB. 5, 1907.
J. A. COREY.
PRINTING PLATE HOLDER.
APPLICATION FILED DEC. 27, 1904.
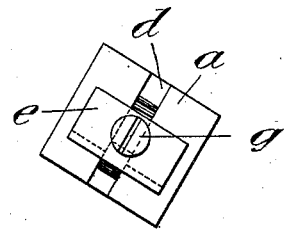
Fig.1.
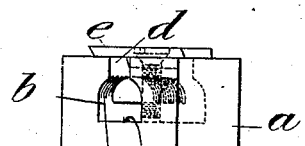
Fig.2.
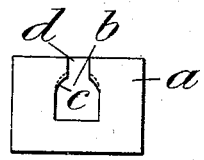
Fig.4.
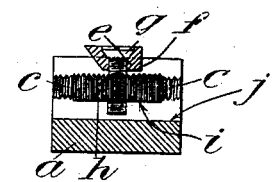
Fig.3.
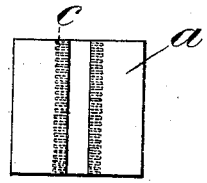
Fig.5.
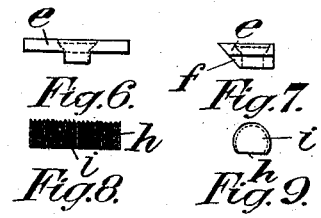
Fig.6. Fig.7.
Fig.8. Fig.9.
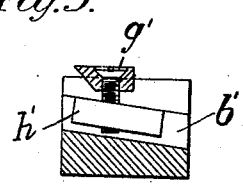
Fig.10.
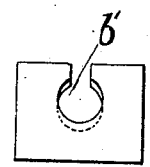
Fig.11.
Witnesses
George E. Hunt
R. Williams
Inventor
per J A Corey
W. E. Evans
Attorney

UNITED STATES PATENT OFFICE.

JAMES A. COREY, OF TWICKENHAM, ENGLAND.

PRINTING-PLATE HOLDER.

No. 843,002.   Specification of Letters Patent.   Patented Feb. 5, 1907.

Application filed December 27, 1904. Serial No. 238,461.

*To all whom it may concern:*

Be it known that I, JAMES ALBERT COREY, a citizen of the United States of America, residing at Ontario, Cole Park Road, Twickenham, England, have invented a new and useful Improvement in Printing-Plate Holders, of which the following is a specification.

This invention relates to clips or catches for mounting stereotype, electrotype, and other printing surfaces.

According to one part of the invention I provide a catch-block of simple construction wherein the clip or catch is capable of adjustment or of fixture in position on the block by the simple operation of turning the holding-down screw, whereby the catch or clip is released or securely fixed in position against displacement. For the purpose I provide the catch-block with a groove having the slot on the top face thereof narrower than the width of the main part of the groove, and on the sides of the main part of the grooves I provide serrations, teeth, or screw-threads. The catch or clip is held down on the block by means of a screw passing through a nut, which nut is provided with serrations, teeth, or screw-threads upon it for engagement with the serrations, teeth, or screw-threads upon the sides of the main part of the groove in the catch-block, so that thus means are provided for a fine adjustment of the clip or catch in position upon the catch-block and very simple means of securing the catch or clip in position for mounting the plate or printing surface.

According to the second part of the invention, instead of providing a series of serrations, teeth, or screw-threads, I provide on the under face of the groove within the catch-block an inclined face corresponding to an inclined face upon the nut or to the inclination of the nut through which passes the holding-down screw.

The invention is illustrated in the accompanying drawings, in which—

Figures 1 to 9 illustrate one modification in which the invention is carried into effect, while Figs. 10 and 11 illustrate a further modification. Fig. 1 is a plan view of a unit catch-block provided according to the invention. Fig. 2 is a perspective elevation corresponding to Fig. 1. Fig. 3 is a cross-sectional elevation corresponding to Figs. 1 and 2. Figs. 4 and 5 are elevation and plan, respectively, of the unit catch-block itself, without the clip or catch, nut, and holding-down screw. Figs. 6 and 7 are detail front elevation and end elevation of the catch or clip employed, and Figs. 8 and 9 are elevation and end elevation of the nut used. Figs. 10 and 11 are cross-sectional elevation and end elevation, respectively, of a unit catch-block provided according to a modified form.

In carrying the invention into effect I advantageously provide a mounting-block in one dimension, at any rate, slightly less than that of the printing plate or surface to be mounted upon it, and on two sides of the mounting-block I provide the usual catches for engagement with two of the edges of the plate, while on the other remaining sides I provide adjustable catch-hooks, provided according to the invention.

In carrying the invention into effect in the provision of a unit catch-block for use in the manner hereinbefore described I provide a block $a$ of a height corresponding to the height of the mounting-block, and I provide transversely in the said block a groove $b$, having the lower part widened out to form sides upon which teeth, serrations, or screw-threads $c$ are formed, such being either cast, tapped, or machined in the sides of the groove. The width of the slot $d$ on the top face of the unit catch-block $a$ is less than that of the groove $b$.

The catch or clip $e$ is advantageously mounted on the catch-block $a$ at right angles to the slot $d$ aforesaid, as illustrated in Figs. 1 and 2, being maintained in proper position by means of a projecting boss $f$, formed on the under face thereof, lying within the slot $d$ aforesaid. The catch or clip $e$ is secured in position by means of a screw $g$, passing through a nut $h$, which lies in the groove $b$ in the catch-block $a$, this nut $h$ being advantageously provided of elongated form and having teeth- serrations, or screw-threads on its top sides for engagement with corresponding teeth, serrations, or screw-threads upon the sides of the groove in the catch-block. This nut may be conveniently formed from a rod, and the screw-threads may be cast upon it, tapped, or machined, as may be convenient, in particular cases. I advantageously form an under face $i$ upon it, so that when the catch or clip and holding-down screw are withdrawn the nut will rest upon the base of the groove in the catch-block, which for that purpose is provided with a flat bottom $j$, so that thus the screw-threaded hole in the nut will always be in alinement with the center line of the slot in the catch-block, and thus the reinsertion of the holding-down screw will always be easily and quickly effected.

In carrying the invention into effect, as illustrated in Figs. 10 and 11, instead of providing the groove or hole $b'$ with screw-threads on its under face the groove may be provided plain, but inclined, and in such case the nut $h'$ has its upper face also inclined, so that thereby when the holding-down screw $g'$ is turned to clamp the edge of the plate in position the nut $h'$ is brought up to the under side of the inclined groove or hole in the unit catch-block, and owing to its inclination upwardly toward the edge of the plate its retraction is precluded.

Instead of providing one inclination to the unit catch-block, as illustrated in Figs. 10 and 11, a series of inclinations may be given to the under face thereof.

In the provision of a catch-block as hereinbefore described one of the principal objects is the economy of production; but apart from this the unit-block, as hereinbefore described, may be considerably modified in construction and form, the constituent parts of the catch-block being provided for use in substantially the manner hereinbefore described.

A catch-block having a number of clips or catches may be employed, and the unit or multiple catch-blocks may be used in a manner substantially different from that hereinbefore described without departing from the present invention. Similarly, a catch provided as hereinbefore described may be used in a mounting-block in which slots are formed diagonally across or otherwise disposed in the mounting-blocks, in which event the construction and use of the adjustable catch provided as hereinbefore described is substantially the same as when used upon a unit catch-block.

What I claim as my invention, and desire to secure by Letters Patent, is—

Means for mounting printing plates and surfaces, consisting of a block, the said block being provided with a slot having overhanging walls, serrations on the under sides of said walls, a block within said slot having serrations therein, a clip and a pin connecting said clip to said after-mentioned block.

In testimony whereof I have signed my name to this specification in the presence of two subscribing witnesses.

J. A. COREY.

Witnesses:
WILLIAM SEWARD EVANS,
REGD. F. PATTERSON.